July 29, 1930.  I. L. WISE  1,771,739
PIPE JOINT
Filed May 21, 1926
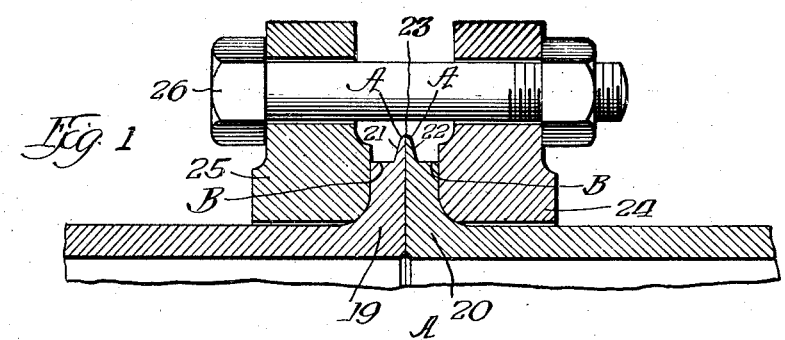
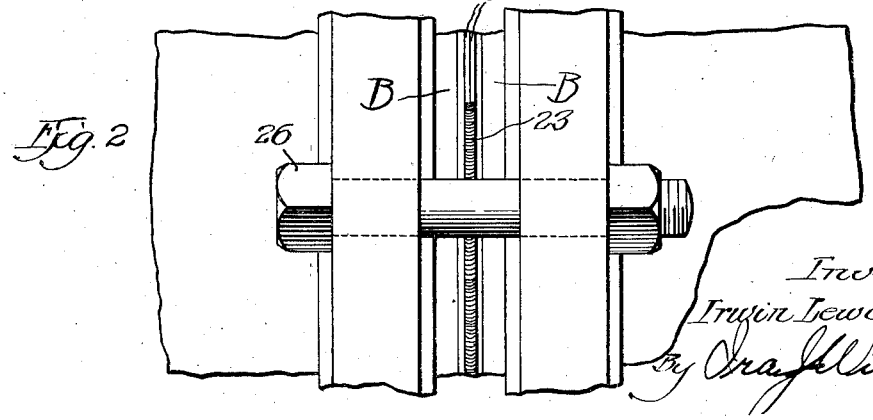

Patented July 29, 1930

1,771,739

UNITED STATES PATENT OFFICE

IRWIN L. WISE, OF CHICAGO, ILLINOIS, ASSIGNOR TO SARGENT & LUNDY INCORPORATED, OF CHICAGO, ILLINOIS, A CORPORATION OF ILLINOIS

PIPE JOINT

Application filed May 21, 1926. Serial No. 110,680.

This invention pertains to pipe couplings and more particularly to a method by which iron or steel pipes having flanges adapted to abut one another may be securely connected together in a fluid-tight and permanent manner but also includes the article produced by the process.

It has become well recognized that the most facile, economic and satisfactory manner in which flanged iron or steel pipes for certain uses may be connected and secured together in fluid-tight relation, is by welding and clamping the joint together. The welding has generally been accomplished by one of two methods both of which are open to several objections which will be more fully dwelt upon hereinafter.

In carrying out one of the aforementioned old and well known methods, the flanges (in some instances but one of the flanges) of the pipes to be connected are flared backwardly along the pipe away from the line or plane of the joint to provide a V-shaped slot circumferentially of the joint into which fused metal may run, the flanges are clamped by clamping rings or plates which abut against the backs of the flanges, the clamping rings are bolted and drawn together, and a flame is passed around the joint over the tips of the flanges and over the V-shaped slot. This fuses or melts the metal down into the slot and seals the joint. In the other instance the corners of the flanges adjacent the joint, (or one of them) are bevelled off to provide the V-shaped slot when the flanges are joined, the joint is clamped as above set forth, and a welding rod of suitable metal is fused into the slot.

However, owing perhaps to the fact that scale (oxidation) forms and to other reasons, the weld made by either method is imperfect and the V-shaped slot is not completely filled or the sides are not fused together, clear to the bottom of the slot.

Another and more serious difficulty is also encountered due largely to the high temperature necessary to accomplish the weld and to the thickness of the flanges. The flanges being thick at the point or line of welding a great amount of heat must be applied and therefore highly heats not only the tips of the flanges at or about the point of welding, but also more remote portions thereof, and the clamping rings or plates and the bolts connecting them. As the parts including the clamping rings and bolts adjacent the portion being welded become heated, they expand while those portions remote from the point of welding, such as the part of the joint immediately inward radially remain cool or substantially cooler.

This unequal heating apparently causes a warping leverage to be effective at or about the point of contact of the interior edges of the pipes radially interior of the point or points where the heating is taking place, with such point of contact providing the fulcrum. The result is that the outer ends of the abutting flanges pull away from one another and are prevented from fully returning to their normal position upon cooling and contracting by the metal which has flowed into that portion of the joint. While this of itself sets up internal stresses and strains within the flanges of the pipes and the clamping rings and bolts, and warps interior portions of the joint away from one another, the extreme heating necessary to weld flanges that are thick also sets up stresses and strains in the pipes, flanges, etc., conducive to warping or early fracture or both.

In the foregoing I have attempted to set forth my theory of the cause or causes of the disadvantageous and objectionable features of prior methods and results, but I have done so merely with a view toward affording a better understanding of my invention. Whatever the causes or theories of the causes of failure of prior methods may be, the results of such failure and my method of overcoming them, as actually tried out in practice, will be more fully discussed below in connection with the accompanying drawing, in which:

Fig. 1 is a sectional elevation of abutting flanges of pipes welded together in accordance with the invention hereof, and Fig. 2 is a top plan view of the fragments illustrated in Fig. 1.

In carrying out my invention the pipe flanges 19 and 20 are machined at their abutting faces and are reduced at their outer ends to provide a relatively narrow welding face or tip. This reduction is effected only along the faces of the flanges opposite the abutting faces in order that no gap or slot will be provided between them. As shown in the drawings the welding collets or lips 21 and 22 are tapered outwardly from the ends of the flanges at which point they together form a very narrow welding face along which the weld 23 is effected by the use of an ordinary oxy-acetylene flame. The relative proportions of the tips 21 and 22 for half-inch mild steel pipes with half-inch flanges are preferably one thirty-second of an inch in width for each welding surface A with three-eighths of an inch vertical depth from the surface A—A to the surfaces B—B on a fifteen degree taper. These proportions are the preferable ones and in the present instance result in a total thickness of the portions 21 and 22 at the surfaces B—B, that is, at the root of the taper, of less than half the combined thickness of the flanges 19 and 20 while their radial height is substantially less than half the total of the flanges.

With this construction very little heat will be required to effect the weld which is preferably done by merely fusing the metal of the tips A—A together and consequently very little heat will be conducted to the flanges or to the clamping rings 24 and 25 and clamping bolts 26 during the welding operation. The large surface area will conduct the heat away and consequently a negligible amount of distortional warping, if any, will take place. The abutting faces of the flanges remain in tight contact throughout their length and the seal is therefore effected over a large area which is not true of prior constructions.

It will, of course, be understood that the mechanical clamp, the clamping rings 24 and 25 and the clamping bolts 26, are first applied to bring the abutting ends of the pipes in proper juxtaposition for the purpose of welding them and the process of welding may be conveniently carried out, the mechanical clamp remaining in place thereafter. In other words, the mechanical clamp is permanently secured in the first instance, whereas in the case of other methods heretofore described it has been necessary to use temporary clamping bolts which are replaced with permanent bolts after welding has been completed or remove the bolts before welding and replace them after welding, the removal, welding and replacement taking effect successively around the circumference of the joint. The weld not only affords a tight seal between the pipes but because of the comparatively thin line of fusion, which is permissible because of the tight seal effected substantially throughout the radial length along the line of juncture, the pipes may be very easily separated whenever desired.

The theories which I have advanced as to the reasons why the prior methods have been unsatisfactory, may or may not be the correct theories, but I have found that by utilizing my method all the objections before encountered by the use of the old methods are entirely overcome. For that reason I do not desire to be limited in any wise by the theories I have advanced nor do I wish to be limited to the details of the construction illustrated and described for the purpose of providing a clear understanding of my invention for obviously many variations and changes may be made without departure from the spirit of the invention and the scope of the appended claims.

I claim:

1. A coupling comprising a pair of members provided with circumferential welding collets having the circumferential margins of their opposed faces disposed in abutting relation and secured together by welding at their outer edges, the circumferential edges of said collets being thinner than the bases of the collets and sufficiently thin to permit the welding of said edges together without transference of heat to the body of the joint in such quantities as to cause distortion of the joint.

2. A coupling for abutting ends of piping members comprising a radially directed circumferentially extending collet or lip on each member at its end to be abutted against the end of the other member, said collets or lips being in surface contact circumferentially from their outer peripheral edges for a substantial distance radially inward and being substantially thinner transversely at their outer peripheral edges than other portions of such collets or lips radially inward from said peripheral edges, said collets or lips at their outer edges being sufficiently thin to permit welding them together along their line of juncture without material transference of heat to adjacent parts of said members.

3. A pipe coupling comprising flanged ends of abutting pipes, said ends being tapered toward the plane of juncture only and providing a relatively thin outer surface relative to the thickness of the flanges across the root of the tapered ends, said thin ends being fused together by welding, said joint being characterized by the tapering formation of the flanged ends permitting the thin extremities thereof to allow fusion or welding to be made by application of a relatively small amount of heat without material transference thereof to the thicker portions of the joint.

4. A piping coupling structure comprising two piping members adapted to abut and register with each other and to be mechanically secured in that relation, a welding collet or lip integral with each of said members, each welding collet or lip having one side in the plane of the juncture surface of its member and being of a thickness less than that of any part of its piping member as measured from the juncture surface of its member, a weld sealing the juncture around the perimeter thereof, and means for mechanically securing said piping members in abutting and registering relation, said piping coupling structure being characterized by the formation of the integral welding collets or lips permitting the welding thereof effectively to seal the juncture by application of a relatively small amount of heat without material transference thereof to the thicker portions of the structure.

5. A pipe coupling comprising the circumferentially flanged ends of abutting pipes, the flanges abutting one another for a substantial distance radially inward from and having reduced portions adjacent to their edges remote from the pipes, said reduced portions each providing a relatively narrow surface at their perimetrical juncture edges whereby said portions may be welded together with a relatively small amount of heat transference to other portions of the flanges, and said edges being welded together by a continuous circumferential weld, and means for mechanically clamping the flanged ends together.

6. The process of coupling piping members which comprises the steps of providing circumferential welding collets or lips on the abutting ends of the piping members and integral therewith, the circumferential edges of said collets being thinner than the bases of the collets and sufficiently thin to permit the welding of said edges together without transference of heat to the body of the joint in such quantities as to cause distortion of the joint, permanently mechanically clamping said ends together, and then welding the opposed tips of the collets or lips to seal the joint by the application of only sufficient heat to effect the welding without causing distortion of the joint.

In witness of the foregoing I affix my signature.

IRWIN L. WISE.